US009578855B2

(12) United States Patent
Sibbald et al.

(10) Patent No.: US 9,578,855 B2
(45) Date of Patent: Feb. 28, 2017

(54) ANIMAL TRAINING SYSTEM AND METHOD

(71) Applicant: THE SECRETARY OF STATE FOR DEFENCE, Salisbury, Wiltshire (GB)

(72) Inventors: Nicola Jane Sibbald, Salisbury (GB); Stephen Nicklin, Salisbury (GB)

(73) Assignee: The Secretary of State for Defence, Salisbury, Wiltshire (GB)

( * ) Notice: Subject to any disclaimer, the term of this patent is extended or adjusted under 35 U.S.C. 154(b) by 43 days.

(21) Appl. No.: 14/429,056

(22) PCT Filed: Sep. 26, 2013

(86) PCT No.: PCT/GB2013/000402
§ 371 (c)(1),
(2) Date: Mar. 18, 2015

(87) PCT Pub. No.: WO2014/049314
PCT Pub. Date: Apr. 3, 2014

(65) Prior Publication Data
US 2015/0245592 A1  Sep. 3, 2015

(30) Foreign Application Priority Data
Sep. 26, 2012  (GB) .................................. 1217183.1

(51) Int. Cl.
*A01K 15/02* (2006.01)
*A01K 29/00* (2006.01)

(52) U.S. Cl.
CPC ............ *A01K 15/02* (2013.01); *A01K 15/027* (2013.01); *A01K 29/00* (2013.01); *Y10S 119/905* (2013.01)

(58) Field of Classification Search
CPC .... A01K 15/02; A01K 15/027; Y10S 119/905
(Continued)

(56) References Cited

U.S. PATENT DOCUMENTS 6,843,158 B2 * 1/2005 Garcia ................... A01K 15/02
                                                                    102/403
6,860,239 B1 * 3/2005 Begun ..................... A01K 1/035
                                                                     119/712
(Continued)

FOREIGN PATENT DOCUMENTS

EP    1942342 A1    7/2008
GB    2480271 A    11/2011

OTHER PUBLICATIONS

International Patent Application No. PCT/GB2013/000402, International Preliminary Report on Patentability mailed Apr. 9, 2015, 9 pages.
(Continued)

*Primary Examiner* — Stanton L Krycinski
(74) *Attorney, Agent, or Firm* — Dean W. Russell; Kilpatrick Townsend & Stockton LLP

(57) ABSTRACT

There is provided an animal training system to train an animal to detect a training odor. The animal training system comprises a target (310) comprising the training odor (320) and a hidden marker (330); and a detector (350) for identifying the hidden marker. There is further provided an animal training method using the animal training system, the animal training method for practice by a supervisor, an animal handler, and an animal. The animal training method comprises placing the target (310) in a location of a search area (300), the target comprising the training odor (320) and the hidden marker (330), the placing being carried out by the supervisor; introducing the animal handler and the animal (305) to the search area; scanning with the detector (350) a candidate location for the hidden marker, the candidate location being a location that is indicated by the animal; and rewarding the animal if the detector indicates the presence of the hidden marker at the candidate location.

3 Claims, 2 Drawing Sheets

(58) Field of Classification Search
USPC .......................................................... 119/712
See application file for complete search history.

(56) References Cited

U.S. PATENT DOCUMENTS

| | | | | |
|---|---|---|---|---|
| 6,874,447 | B1* | 4/2005 | Kobett | A01K 15/021 119/712 |
| 7,617,799 | B2* | 11/2009 | Kates | A01K 15/02 119/712 |
| 7,633,397 | B2* | 12/2009 | Dugan | G01N 33/0073 340/573.3 |
| 7,634,975 | B2* | 12/2009 | Kates | A01K 15/021 119/712 |
| 7,921,810 | B2* | 4/2011 | Lumbroso | A61K 49/0008 119/421 |
| 8,522,725 | B1* | 9/2013 | Moore | A01K 15/02 119/707 |
| 8,543,134 | B2* | 9/2013 | Lopez | A01K 15/021 455/411 |
| 8,931,327 | B2* | 1/2015 | Pearce | A01K 15/02 119/174 |
| 9,345,232 | B2* | 5/2016 | Chapin | A01K 1/031 |
| 2003/0126977 | A1 | 7/2003 | Garcia et al. | |
| 2006/0180092 | A1 | 8/2006 | Reiter | |
| 2008/0127905 | A1* | 6/2008 | Ramon | G01V 9/00 119/718 |
| 2009/0044761 | A1* | 2/2009 | Chapin | A01K 1/031 119/720 |
| 2009/0077908 | A1* | 3/2009 | Brasfield | G01N 33/0057 52/198 |
| 2009/0139459 | A1* | 6/2009 | Habacivch | A01K 15/02 119/420 |
| 2012/0111285 | A1 | 5/2012 | Pearce et al. | |

OTHER PUBLICATIONS

United Kingdom Patent Application No. GB 1217183.1, Search Report mailed Dec. 24, 2012, 3 pages.
International Patent Application No. PCT/GB2013/000402, International Search Report and Written Opinion mailed Dec. 12, 2013, 15 pages.
United Kingdom Patent Application No. GB 1316976.8, Combined Search and Examination Report mailed Mar. 19, 2014, 5 pages.

* cited by examiner

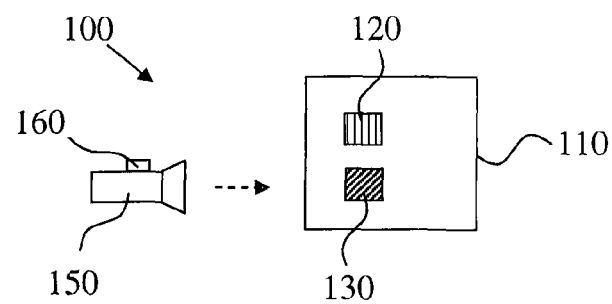
Fig. 1
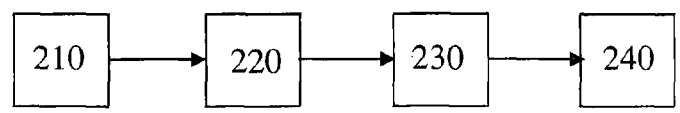
Fig. 2
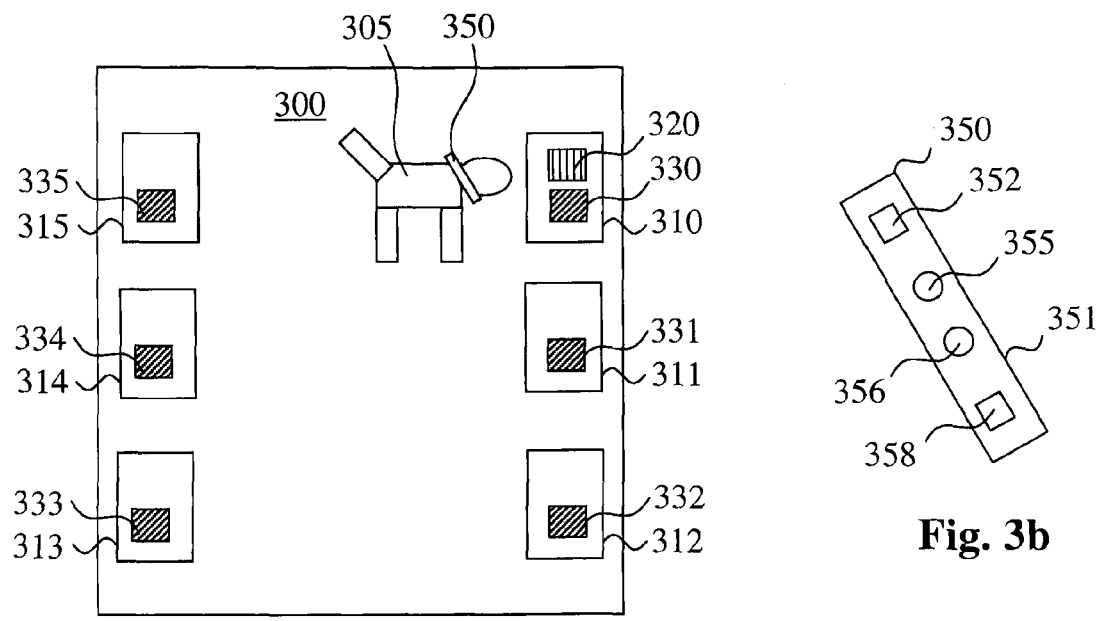
Fig. 3a
Fig. 3b

ANIMAL TRAINING SYSTEM AND METHOD

CROSS REFERENCE TO RELATED APPLICATIONS

This application is the U.S. national phase of International Application No. PCT/GB2013/000402 filed on Sep. 26, 2013, and published in English on Apr. 3, 2014 as International Publication No. WO 2014/049314 A1, which application claims priority to Great Britain Patent Application No. 1217183.1 filed on Sep. 26, 2012, the contents of which are incorporated herein by reference.

TECHNICAL FIELD OF THE INVENTION

The invention relates to an animal training system and method, and in particular to an animal training system and method for training an animal to detect an odour.

BACKGROUND TO THE INVENTION

Animals are often used to detect devices and/or substances that are not easily detectable by humans/equipment, and are commonly used in situations where the animal has a greater sensory response to a particular odour than a human/equipment.

In order for an animal to accurately determine the presence of particular devices and/or substances, the animal must first be trained to seek out odours associated with the particular devices and/or substances.

Such training is commonly carried out by rewarding the animal when it indicates the location of a training odour, so that the animal learns to seek out the training odour in the expectation of receiving a reward, for example food/toy/praise.

One of the problems with training animals is that the animal can often distinguish between training scenarios and real scenarios due to the inherent differences between them, and this can lead to differences in performance between different scenarios.

In particular, in a training scenario the animal handler needs to be aware of where the training odour is located, so that the animal can be rewarded when it indicates that location, however in a real scenario, the animal handler will not be aware of the location of the devices and/or substances that have the training odour.

Animal handlers naturally have a desire to see their animals succeed in training tasks, and may consciously or unconsciously give visual cues to their animals that assist the animals in reaching the correct locations, particularly in situations where the animal handler and animal are being assessed for their effectiveness.

If the animal is trained when the animal handler is aware of the correct location, then the animal may take cues from the animal handler as to the correct location, and use these cues rather than the training odour to determine the location of the devices and/or substances. Then, when the animal is used in a real scenario where the animal handler is not aware of the correct location, the animal may be much less effective in determining the location of devices and/or substances having the training odour.

If the animal is trained whilst the animal handler is not aware of the correct location, then the animal handler cannot determine whether the animal is indicating the correct location and cannot determine whether or not to reward the animal. Rewarding the animal when it should not be rewarded, or not rewarding the animal when it should be rewarded, can result in confusing the animal, such that training becomes less efficient or ineffective.

It is therefore an aim of the invention to enhance the training of the animal.

SUMMARY OF THE INVENTION

According to an embodiment of the invention, there is provided an animal training system to train an animal to detect a training odour. The animal training system comprises a target comprising the training odour and a hidden marker; and a detector for identifying the hidden marker.

There is further provided an animal training method to train an animal to detect a training odour, the animal training method for practice by a supervisor, an animal handler, and an animal. The animal training method utilises the above animal training system, and comprises:
  placing the target in a location of a search area, the target comprising the training odour and the hidden marker, the placing being carried out by the supervisor;
  introducing the animal handler and the animal to the search area;
  scanning with the detector a candidate location for the hidden marker, the candidate location being a location that is indicated by the animal; and
  rewarding the animal if the detector indicates the presence of the hidden marker at the candidate location.

Preferably, the placing of the target by the supervisor is carried out with both the animal handler and the animal not being present in the search area, so that the animal handler and animal do not have any knowledge of whereabouts in the search area the target has been placed.

Preferably, the introducing of the animal handler and the animal to the search area is carried out with the supervisor not being present in the search area, so that neither the animal handler nor the animal can take cues from the supervisor as to whereabouts in the search area the target has been placed. In particular, the supervisor may leave the search area after placing the target, and before the animal handler and the animal enter the search area.

The hidden marker is a marker that is not understandable by an un-assisted human, and which the detector is configured to detect.

Since the target is fitted with a hidden marker which is discernable by the detector, the animal handler does not have to be aware of the location of the target during the time when the animal is searching for the target. Once the animal indicates a location, the detector can be used to determine whether the location indicated by the animal is the location of the target, and the animal can be rewarded or not rewarded accordingly.

The location indicated by the animal is determined to be the location of the target if the detector detects the presence of the hidden marker at the location that is indicated by the animal. Since the hidden marker is not discernable by the animal handler until the detector is used, the animal handler will not be able to identify the hidden marker during the time when the animal is searching for the target and give away unconscious cues to the animal that the animal may interpret to help it find the target. Instead, the animal must rely on its ability to detect odours, just as is the case in a real scenario.

The hidden marker and detector provide an animal training system that can be used to very closely replicate a real scenario, whilst maintaining the ability of a human to decide whether or not to reward the animal based upon how well the animal indicates the location of the target.

Advantageously, the detector may comprise an attachment configured to fit the detector to the animal. Then, when the animal indicates a location the detector can be checked to see if the hidden marker is present, and therefore whether or not the animal should be rewarded. Alternatively, the detector could be held by the animal handler, although fitting the detector to the animal prevents the animal handler from using the detector to determine the position of the target before the animal has settled on a candidate location.

The detector may only indicate the presence of the hidden marker when the detector is at the location of the target. Then the animal handler is prevented from determining the location of the hidden marker when entering a search area, but must wait until the animal has indicated a location and until the detector has been moved to that location before the detector will confirm the presence of the hidden marker. Clearly, the above statement of the detector being at the location of the target means that the detector is in close proximity to the target, for example within 1 meter of the target, preferably within 50 cm of the target, and more preferably within 30 cm of the target.

The animal training system may further comprise a controller that is configured to indicate when the detector is at the location of the target. Then, the detector may be fixed to the animal and the controller may be operated by the animal handler. The controller can inform the animal handler when the detector is at the location of the target, but may not itself be capable of detecting the hidden marker to prevent the handler from using the controller to determine the position of the target prior to the animal settling at a candidate location.

Furthermore, the controller may be configured to only inform the animal handler that the detector is at the location of the target, if the controller is at least 5 m away from the detector, preferably at least 10 m away from the detector. This helps ensure that the animal handler cannot take the animal on a tour of the search area, and continually use the controller to check for the detector indicating that the detector is at the location of the target. Instead, the animal has to move to the location of the target under its own volition, just as in a real scenario. Checking that the controller is at least 5 m away from the detector could for example be implemented by incorporating an RFID tag in the detector which the controller can detect from up to 5 m away. Accordingly, if the RFID tag is not detected, then the controller is known to be more than 5 m away from the detector. Alternatively, a positioning system could be used based upon navigational signals and/or beacons combined with time of flight measurements.

The detector preferably does not give any indication that the animal could interpret as indicating the correct location, to avoid the animal from simply moving around different locations until the animal senses from the detector that the correct location has been reached.

A detector which indicated the location of the target before the animal had settled on the location of the target, could lead to a handler to give away cues to the animal as to the location of the target before the animal had actually settled on the location of the target. Accordingly, the detector may be configured to indicate the presence or absence of the hidden marker only when a check command is initiated by a person using the animal training system. Then, the detector does not provide any information as to the location of the target until the animal has settled at a candidate location and the check command is initiated by the animal handler and/or the supervisor. The check command may for example be initiated by a person pressing a button on the detector, or by a person pressing a button on the controller which then interrogates the detector. The detector may only allow intermittent initiation of the check command, for example once a first check command has been initiated, the detector may inhibit the initiation of a subsequent check command for a predetermined length of time after the first check command was initiated.

The hidden marker may for example be an RFID tag, with the detector comprising an RFID tag reader, or the hidden marker may for example a material that is normally invisible but which fluoresces under Ultra Violet light, with the detector comprising an Ultra Violet light for illuminating the material.

Advantageously, the animal training system may further comprise dummy targets which do not have the training odour. Then, the dummy targets can be placed in the search area to help ensure that the animal is trained to search for the training odour, rather than any other superfluous odour given off by the targets themselves. The dummy targets are preferably similar to the target having the training odour.

Furthermore, the dummy targets may comprise dummy markers, the dummy markers being similar to the hidden marker, the hidden marker being distinguishable from the dummy markers using the detector. This can help ensure that the animal is trained to search for the training odour, rather than any other superfluous odour given off by the hidden marker itself. The hidden marker may be distinguishable from the dummy markers by the information that the markers carry. For example, the markers may be RFID tags with the hidden marker storing a different identification number to the dummy markers, or the markers may be Ultra Violet sensitive material with the material on the hidden marker forming the wording "correct marker" and the material on the dummy markers forming the wording "incorrect marker".

The animal may be a dog, since dogs are very sensitive to odours, although other types of animal could alternatively be used.

BRIEF DESCRIPTION OF THE DRAWINGS

Embodiments of the invention will now be described by way of example only and with reference to the accompanying drawings, in which:

FIG. 1 shows a schematic diagram of an animal training system according to a first embodiment of the invention;

FIG. 2 shows a flow diagram of an animal training method using the FIG. 1 animal training system;

FIG. 3a shows a schematic diagram of an animal training system according to a second embodiment of the invention;

FIG. 3b shows an enlarged view of a dog collar forming part of the FIG. 3a animal training system.

Figure 4:
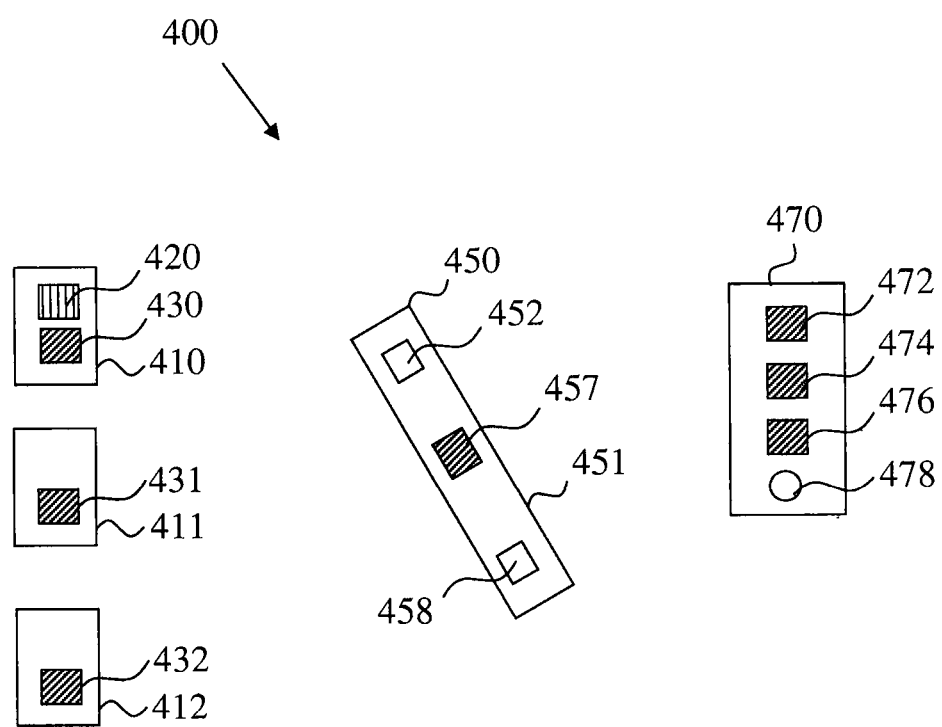
FIG. 4 shows a schematic diagram of an animal training system according to a third embodiment of the invention.

The drawings are for illustrative purposes only and are not to scale.

DETAILED DESCRIPTION

A first embodiment of the invention will now be described with reference to the schematic diagram of FIG. 1, which shows an animal training system 100 comprising a target 110 and a detector 150.

The target 110 is a sheet of adhesive-backed paper, which is impregnated with a training odour 120 and an UV sensitive marker 130. The UV sensitive marker 130 has UV sensitive material distributed in a first pattern, for example spelling out the word "Correct".

The detector 150 is a UV light emitter, which is activated by push-button 160 to emit a pulse of UV light, for example having a duration of 0.5 seconds. Once the detector has been activated, it cannot be activated again for a short period of time, for example for at least another five seconds.

In use, referring to FIG. 2, the sheet of adhesive-backed paper 110 may be applied 210 to an object within a search area by a supervisor, whilst both an animal handler and an animal are not present in the search area.

Then, the supervisor leaves the search area and the animal handler is provided with the detector 150. The animal handler and the animal are introduced 220 to the search area, and the animal handler prompts the animal to search for the training odour 120. Once the animal settles on a candidate location for where the animal believes the training odour exists, the animal handler issues a check command by pressing 230 the button 160 on the detector 150.

The detector 150 emits a pulse of UV light, and if the animal has indicated the correct location of the training odour 120, then the UV light causes the UV sensitive material of the hidden marker 130 to fluoresce and display the word "Correct". If the word "Correct" is displayed, then the animal has successfully located the training odour and is rewarded 240 accordingly, for example by food or a toy.

Preferably, additional sheets of adhesive-backed paper are also impregnated with UV sensitive markers, but not with the training odour, and distributed in the search area. The UV sensitive markers have UV sensitive material distributed in a second pattern, for example spelling out the word "Incorrect". Then, the additional sheets of adhesive-backed paper act as dummy targets having dummy markers, to ensure the animal is trained to look for the training odour, rather than an odour of the adhesive-backed paper, or an odour of the UV sensitive material.

Since the pulse of UV light only lasts for a short time, for example 0.5 seconds, there is no time for the animal handler to scan the UV light around the peripheral area to search for the target 110. A predetermined time delay, for example 5-30 seconds, before the detector 150 can be made to issue another pulse of light, prevents the animal handler from being able to quickly scan multiple different locations to determine themselves where the target 110 lies before the animal settles on a candidate location.

A second embodiment of the invention will now be described with reference to FIGS. 3*a* and 3*b*. FIG. 3*a* shows an animal training system when put to use within a search area 300 and with a dog 305.

The animal training system comprises six containers 310-315, the containers for example being boxes and/or bags. Each of the containers 310-315 has a respective RFID tag 330-335. The RFID tags are discrete objects which are placed within and/or attached to the containers.

The container 310 additionally contains a training odour 320, and so forms a target for the dog 305. The training odour 320 is provided by a discrete object which is placed within and/or attached to the container 310. The containers 311-315 do not have the training odour, and so form dummy targets with dummy markers 331-335.

The animal training system according to the second embodiment also comprises a detector 350. Referring to FIG. 3*b* which shows an enlarged view of the detector 350, the detector 350 comprises a dog collar 351 for attaching the detector to the dog 305, an RFID tag reader 352, red and green indication lights 355 and 356 respectively, and a push button 358.

The RFID tag reader 352 is programmed to read RFID tags in response to the push button 358 being pressed. In particular, the RFID tag reader is programmed to light up the green indication light 355 in response to the RFID tag 330 being read, and to light up the red indication light 356 in response to any of the RFID tags 331-335 being read. If no RFID tags are read by the reader, then neither of the indication lights 355 and 356 are lit (or both indication lights could be lit together).

The RFID tags 330-335 are passive RFID tags, and the RFID reader 352 has a range of 50 cm for detecting the RFID tags.

In use, the dog 305 is set loose within the training area 300 and allowed to settle upon a location where the dog indicates the training odour is to be found. The animal trainer approaches the dog 305, and presses the push button 358 on the dog's collar 351.

If the dog 305 has settled on the location of the target 310 having the training odour 320, then pressing the button 358 causes the RFID tag 330 to be read by the RFID tag reader 352. In response to reading the RFID tag 330, the RFID tag reader 352 lights up the green indication light 355, and the animal handler may reward the animal for finding the training odour.

If the dog 305 has settled on the location of one of the dummy targets 311-315, which do not have the training odour, then pressing the button 358 causes one of the RFID tags 331-335 to be read by the RFID tag reader 352. In response to reading one of the RFID tags 331-335, the RFID tag reader 352 lights up the red indication light 356, giving the animal handler useful feedback that the dog is searching for an odour of the containers, rather than the training odour.

If the dog 305 has settled on a location away from all the containers 310-315, then pressing the button 358 does not result in any RFID tags being read, and the RFID tag reader 352 lights up none or both of the green and red indication lights 355 and 356. This gives the animal handler useful feedback that the dog is being distracted by something else within the search area or becoming confused.

Since the detector is mounted on the dog, the animal handler cannot use the detector themselves to determine the location of the training odour. Instead, the animal handler must wait until the dog has settled upon a location, before taking hold of the collar 351 and pressing the push button 358 to see whether the location is correct.

The green and red indication lights are LEDs. Preferably, indication lights are used rather than sounds to avoid distracting the animal (in this case a dog) from the task.

A third embodiment of the invention will now be described with reference to the schematic diagram of FIG. 4. FIG. 4 shows an animal training system 400 comprising targets 410-412, a detector 450, and a controller 470.

The targets 410-412 comprise respective plastic cuboids and RFID tags 430-432. The RFID tags 430-432 are sticky backed papers that each have an antenna embedded within them, the antennas resonating at different RF frequencies to one another.

The target 410 additionally has a training odour 420 impregnated into a sticky-backed paper which is applied to the side of the respective plastic cuboid, and so forms a target for the dog 305. The targets 411-412 do not have the training odour, and so constitute dummy targets with dummy RFID tags 431-432.

The detector 450 comprises a dog collar 451 for attaching the detector to an animal such as a dog, an RFID tag reader 452, an RFID tag 457, and a transceiver 458. The RFID tag reader 452 is configured to read RFID tags 410-412 in response to receiving a check command from the transceiver 458, and to report whether and which RFID tag(s) are detected back to the transceiver 458.

The transceiver 458 is configured to transmit and receive signals from a transceiver 472 of the controller 470. The controller 470 is designed for use by a person such as the animal handler or supervisor, and comprises the transceiver 472, an RFID tag reader 474, a push button 476, and an indicator light 478. The RFID tag reader 472 is a long range passive RFID tag reader which is capable of reading the RFID tag 457 of the detector 450 up to distances of 5 m.

The transceiver 472 is configured to send a check command to the transceiver 458 of the detector 450 once the push button 476 is pressed, but only if the RFID tag reader 472 cannot detect the presence of the RFID tag 457 of the detector 450. The transceiver 472 is further configured to light the indicator light 478 up in green if the transceiver 458 reports to the transceiver 472 that the RFID tag reader 452 has detected the RFID tag 430, and to light the indicator light 478 up in red if the transceiver 458 reports to the transceiver 472 that the RFID tag reader 452 has detected the RFID tag 431 or 432. Subsequent presses of the push button 476 do not have any effect unless the controller 470 is reset, for example by the supervisor.

In use, the target 410 is placed in a box in a search area by a supervisor, and the dummy targets 411 and 412 are placed by the supervisor in different locations from the target 410. The supervisor leaves the search area, and helps the animal handler apply the detector 450 to a dog, and passes the animal handler the controller 470.

The animal handler and dog are introduced to the search area, and the dog is allowed to search for the training odour. Once the dog has settled on a location, the animal handler presses the push button 478 on the controller 470.

The transceiver 472 then checks whether the RFID tag 457 embedded in the detector 450 can be detected using the RFID tag reader 474, and if it cannot, then the transceiver 472 sends a check command to the transceiver 458 of the detector 450. If the RFID tag 457 embedded in the detector 450 can be detected using the RFID tag reader 474, then the push button has no effect and the check command is not issued. Accordingly, the animal handler having the controller 470 must be at least 5 m away from the dog having the detector 450 in order for the check command to be issued, thereby helping ensure that the animal handler does not physically take the dog to the correct location.

Once the transceiver 458 of the detector 450 receives the check command, it uses the RFID tag reader 452 to determine which (if any) of the RFID tags 430-432 are nearby, for example the RFID tag reader 452 may have a detection range of 0.5 m. The transceiver 458 of the detector 450 reports back to the transceiver 472 of the controller 470 whether any of the tags 430-432 were detected, and if so then which tag was detected.

The transceiver 472 of the controller 470 receives the report from the transceiver 458 of the detector 450, and if the report indicates that the RFID tag 430 was detected, then the indicator light 478 is lit up green to indicate that the dog has correctly found the training odour. The indicator light remains lit up in green until the controller 470 is reset by the supervisor.

If the report indicates that no RFID tags were detected, or that the RFID tags 431 or 432 were detected, then the indicator light 478 is lit up red to indicate that the dog has failed to find the training odour. The indicator light remains lit up in red until the controller 470 is reset by the supervisor, for example by pressing button(s) of the controller in a predetermined sequence that is not revealed to the animal handler.

The controller 470 means that the animal handler must operate at a distance from the dog, and so cannot for example lead the dog around all the locations where they believe the training odour might be found.

Further embodiments falling within the scope of the appended claims will also be apparent to those skilled in the art.

The invention claimed is:

1. An animal training method to train an animal to detect a training odour, the animal training method for practice by a supervisor, an animal handler, and an animal, the animal training method comprising:
   placing a target in a location of a search area, the target comprising a training odour and a hidden marker, the placing being carried out by the supervisor;
   introducing the animal handler and the animal to the search area;
   scanning, with a detector comprising an electronic emitter, a candidate location for the hidden marker, the candidate location being a location that is indicated by the animal;
   rewarding the animal if the detector indicates the presence of the hidden marker at the candidate location.

2. The animal training method of claim 1, wherein the placing is carried out with both the animal handler and the animal not being present in the search area.

3. The animal training method of claim 1, wherein the introducing the animal handler and the animal to the search area is carried out with the supervisor not being present in the search area.

* * * * *